W. H. BRISTOL.
DIFFERENTIAL PRESSURE RECORDER.
APPLICATION FILED MAY 29, 1908.
1,038,526.
Patented Sept. 17, 1912.
2 SHEETS—SHEET 2.
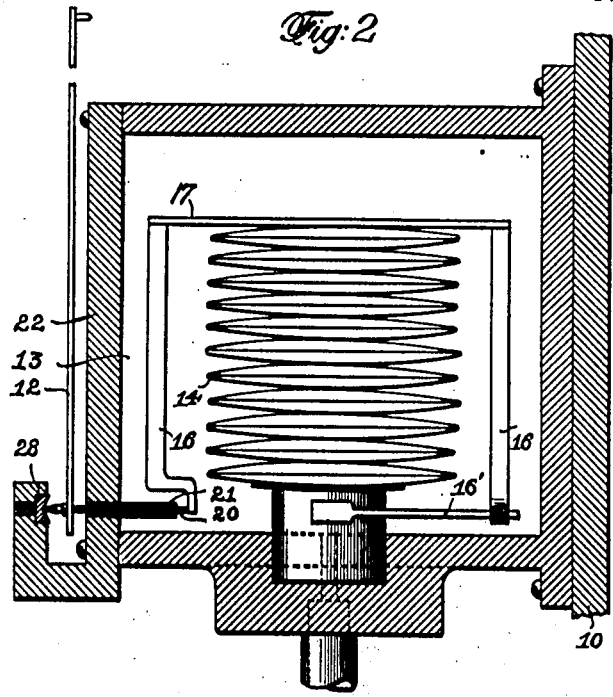
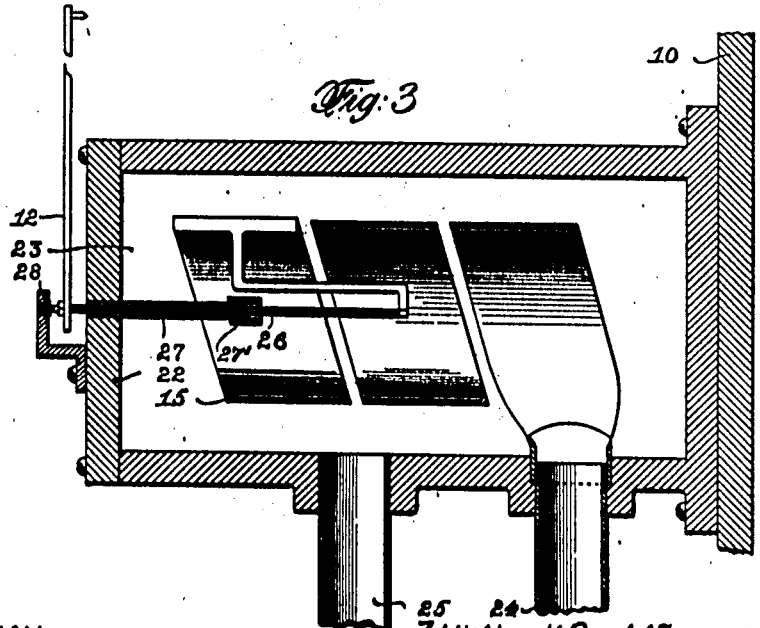
Witnesses:
William H. Bristol Inventor
By his Attorney

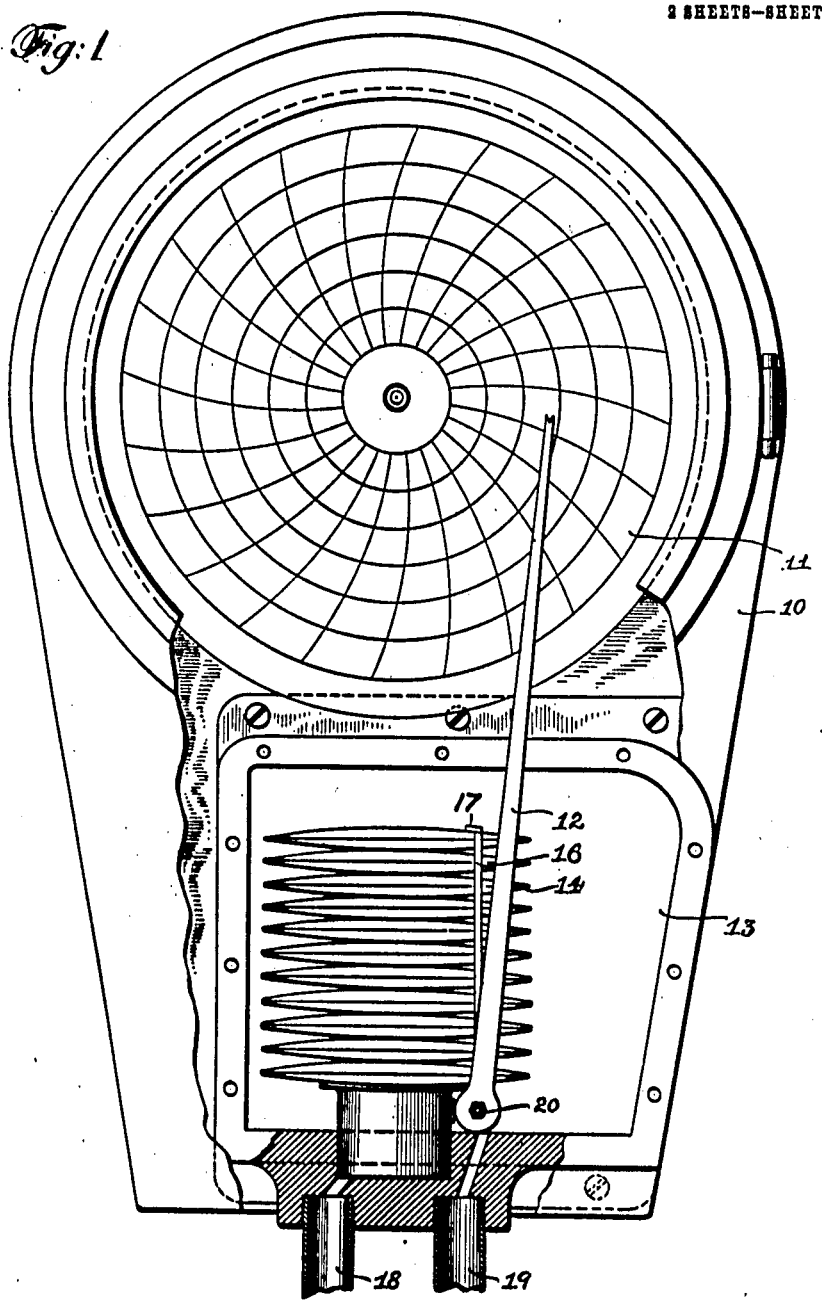

UNITED STATES PATENT OFFICE.

WILLIAM H. BRISTOL, OF NEW YORK, N. Y., ASSIGNOR TO THE BRISTOL COMPANY, OF WATERBURY, CONNECTICUT, A CORPORATION OF CONNECTICUT.

DIFFERENTIAL-PRESSURE RECORDER.

1,038,526.  Specification of Letters Patent.  Patented Sept. 17, 1912.

Application filed May 29, 1908. Serial No. 435,740.

*To all whom it may concern:*

Be it known that I, WILLIAM H. BRISTOL, a citizen of the United States, residing at New York, in the county of New York and State of New York, have invented certain new and useful Improvements in Differential-Pressure Recorders, of which the following is a specification.

My invention relates to recording devices, and more particularly to a device for directly recording the differences of two fluid pressure; and it has for its object to make the said device independent of the pressure of the atmosphere or medium in which said device is located, to simplify the construction of such devices, and to avoid the use of stuffing boxes or the like which produce friction of the recording mechanism.

For this purpose my invention consists of certain novel features of construction and arrangement of parts, as set forth in the specification and shown in the accompanying drawings, in which—

Figure 1 is a front elevation of the differential pressure recorder with a portion of the instrument casing and the cover of the pressure casing removed. Fig. 2 is a sectional view of the pressure casing. Fig. 3 is a sectional view of a different form of actuating means for the recording arm.

Similar characters of reference designate corresponding parts throughout the several views.

Referring to the drawings, 10 indicates a protecting instrument casing containing the usual clock or other mechanism (not shown) for rotating or moving a record sheet 11, and the actuating mechanism for the recording arm 12. This actuating mechanism is shown entirely housed within a pressure casing 13, secured to the back plate of the protecting casing 16. In many designs of pressure recording devices, intermediate transmitting and multiplying mechanism is employed. In case such mechanism be employed in connection with the differential pressure recorder herein set forth, the same may or may not be contained within the said pressure casing 13.

In Figs. 1 and 2 I have shown as the actuating means a number of superimposed, communicating, expansible diaphragms 14 such as employed in the pressure gages set forth in my prior U. S. Patents #420,570, #822,244, #839,981 and 839,982; and in Fig. 3 an expansible helical tube 15 closed at one end, and open at the other to one of the pressures.

Referring to Figs. 1 and 2, the set of expansible diaphragms is restrained from moving vertically and constrained to angular movement by means of flexible bands or by links 16 secured at their upper ends to a piece 17 attached eccentrically to the top of the set of diaphragms as set forth in my prior Patent #822,244. This set of diaphragms is secured at the bottom to the pressure casing 13, and communicates with one of the pressures through the inlet pipe 18. A second inlet pipe 19 communicates directly with the pressure casing 13. The lower end of one of the links 16 is pivotally connected to a rigid pin 16' and near the bottom of the casing 13, as shown; while the lower end of the other link is fixedly connected to a shaft 20 passing through a sleeve 21 and whose axis is in line with the axis of the pivotal connection of the other link, thus forming an axis of natural rotation about which the said series of diaphragms is constrained to move. The sleeve 21 is preferably of considerable length in proportion to the diameter of said contained shaft, and is secured preferably to and passes through the removable cover 22 of the pressure casing. A shaft of from three to four hundredths of an inch in diameter with a clearance of from one to two thousandths of an inch has been found satisfactory. At the inner end of the shaft this clearance is preferably increased as by the piece 27', Fig. 3. The shaft 20 passes entirely through said sleeve and carries at its outer end the recording arm 12, the casing being closed with the exception of the said sleeve 21 and the said inlets 18 and 19, which latter convey the mediums whose differential pressure is to be recorded. The said sleeve with its shaft is sealed by means of a suitable material such as grease, lubricant or liquid, and preferably a mineral, non-drying oil as cylinder oil, which at the same time acts as a lubricant for the shaft 20 forming a practically frictionless bearing for the said shaft, and by its capillary attraction and adhesion sealing the pressure casing 13 as a whole. The increased diameter of the sleeve at its inner end affords a convenient means of uniformly applying the sealing material so that it may be distributed through the sleeve to form the seal.

In Fig. 3, the actuating means, located within the pressure casing 23, is the helical tube 15 closed at one end and secured at the other to the bottom of the said casing and with which one of the pressures communicates through a suitable inlet 24, the other communicating directly with the casing through inlet 25. To the closed end of the helical tube 15 is fixedly secured a connecting piece bent substantially to the shape shown and terminating at the longitudinal axis of the tube, where it is secured to a shaft 26 also in the axis of the said helical tube. This shaft as in the previously described form passes through a sleeve 27 of suitable length and secured to and passing through the front cover of the casing 28. A suitable sealing material is held in said sleeve to seal the same as in the former case. A thrust bearing such as the jewel bearing 28 may be provided for the outer end of shaft 20, Figs. 1 and 2 and for the shaft 26, Fig. 3 when high pressures exist in the sealed chamber, in order that the said shafts shall not be forced through their respective sealing sleeves due to the high pressure on their inner end.

The pressure in the casings 13 and 23 is effectively sealed in both forms, while the freedom of the movement of the actuating shaft and consequently of the recording arm is not materially affected. The device permits of the recording of extremely delicate movements resulting from the application of but a very small actuating power produced by slight differences of the pressures existing respectively within tube or diaphragm, and the containing sealed pressure casing. If desired, the pressure casing 13, as well as the diaphragms 14, or helical tube 15, may be filled with a suitable liquid or liquids, the difference of whose pressures it is desired to record, of which act simply as a pressure transmitting medium. If the liquid within the pressure chamber be used as a transmitting liquid and be of the proper quality it may at the same time serve as the sealing liquid. It has been found that even an extremely great pressure will be perfectly maintained within the pressure chamber, the seal between the shaft and its sleeve through capillary attraction and adhesion being capable of resisting extremely high differences of pressure, but not producing appreciable resistance to rotation. Various other applications of this seal will readily suggest themselves, as for example to instruments where the ranges of pressure are such that it is desirable to eliminate the effect due to variations in the surrounding atmosphere.

The device is simple in its construction, is positive in its action and suitable for the measurement of the differential pressures of various kinds of fluid, can be constructed to respond to exceedingly slight differences of pressures and is durable and readily portable.

I am aware that various differential pressure recorders could be devised in which some part of the actuating mechanism might be brought through a stuffing box containing packing or the like, to seal the pressure chamber, but I do not wish to claim that means of sealing the pressure chamber as it is unreliable, cumbersome, and produces too much friction.

I claim:—

1. In a differential pressure recorder: a sealed pressure casing, and an inlet thereto for one of the pressures; pressure actuated mechanism within said casing, exposed on the outside to the pressure existing in the casing and constrained to angular motion; an inlet to said mechanism for the other of said pressures and to which the said mechanism is exposed on the inside, whereby said mechanism is adapted to oscillate proportionally to varying differences between the pressures existing in said mechanism and said casing; a shaft in the axis of oscillation of said pressure actuated mechanism and oscillated thereby; a horizontal pressure sealing tube of small diameter relatively to its length, affording a substantially frictionless bearing for said shaft and extending through a wall of said casing, said tube being adapted to retain a film of a suitable sealing liquid to surround a portion of said shaft which extends therethrough; and a recording arm outside of said sealed pressure casing and in connection with said shaft.

2. In a differential pressure recorder; a sealed pressure casing, and an inlet thereto for one of the pressures; pressure actuated mechanism within said casing, exposed on the outside to the pressure existing in the casing and constrained to angular motion; an inlet to said mechanism for the other of said pressures and to which the said mechanism is exposed on the inside, whereby said mechanism is adapted to oscillate proportionally to varying differences between the pressures existing in said mechanism and said casing; a shaft in the axis of oscillation of said pressure actuated mechanism and oscillated thereby; a horizontal pressure sealing tube of small diameter relatively to its length, affording a substantially frictionless bearing for said shaft and extending through a wall of said casing, said tube being adapted to retain a film of a suitable sealing liquid to surround a portion of said shaft which extends therethrough; a portion of enlarged internal diameter at the inner end of said tube to provide a reservoir for the sealing liquid; and a recording arm outside of said sealed pressure casing and in connection with said shaft.

In testimony whereof I affix my signature in presence of two witnesses.

WILLIAM H. BRISTOL.

Witnesses:
  FRED'K F. SCHUETZ,
  SALLY O. YUDIZKY.